United States Patent
Olsen et al.

(10) Patent No.: US 10,762,045 B2
(45) Date of Patent: Sep. 1, 2020

(54) MOUNTING DYNAMIC ENDPOINTS

(71) Applicant: Caringo, Inc., Austin, TX (US)

(72) Inventors: Glen Olsen, Paraparaumu (NZ);
Jonathan Ring, Austin, TX (US);
Russell Turpin, Corpus Christi, TX (US)

(73) Assignee: CARINGO, INC., Austin, TX (US)

( * ) Notice: Subject to any disclaimer, the term of this patent is extended or adjusted under 35 U.S.C. 154(b) by 396 days.

(21) Appl. No.: 15/661,920

(22) Filed: Jul. 27, 2017

(65) Prior Publication Data
US 2018/0032519 A1 Feb. 1, 2018

Related U.S. Application Data

(60) Provisional application No. 62/368,048, filed on Jul. 28, 2016.

(51) Int. Cl.
| | | |
|---|---|---|
| *G06F 16/30* | (2019.01) | |
| *G06F 16/16* | (2019.01) | |
| *G06F 16/182* | (2019.01) | |
| *H04L 29/08* | (2006.01) | |

(52) U.S. Cl.
CPC .......... *G06F 16/164* (2019.01); *G06F 16/162* (2019.01); *G06F 16/183* (2019.01); *H04L 67/1097* (2013.01)

(58) Field of Classification Search
CPC .................................................. G06F 16/164
See application file for complete search history.

(56) References Cited

U.S. PATENT DOCUMENTS

| | | | |
|---|---|---|---|
| 2004/0034550 A1 | 2/2004 | Menschik et al. | |
| 2009/0276771 A1* | 11/2009 | Nickolov | G06F 9/4856 717/177 |
| 2010/0049817 A1 | 2/2010 | Xu | |
| 2012/0303600 A1 | 11/2012 | Mukhopadhyay et al. | |
| 2013/0226888 A1 | 8/2013 | Govind et al. | |
| 2016/0210204 A1* | 7/2016 | Clark | G06F 11/1451 |
| 2016/0212120 A1* | 7/2016 | Bryant | G06F 17/277 |

FOREIGN PATENT DOCUMENTS

JP 2014-032610 2/2014

OTHER PUBLICATIONS

International Preliminary Report on Patentability and Written Opinion PCT/US2017/044236, dated Feb. 7, 2019.
International Search Report for PCT/US2017/044236, dated Nov. 8, 2017.
Written Opinion of the International Searching Authority for PCT/US2017/044236, dated Nov. 8, 2017.

* cited by examiner

*Primary Examiner* — Amanda L Willis
(74) *Attorney, Agent, or Firm* — Beyer Law Group LLP

(57) ABSTRACT

A client application is provided with a view of a subset of objects within an object store. A REST protocol, REST interface, or API may be used to access the objects. A coupling server may include a filter and a generator. The generator may automatically generate object metadata for newly created files that matches a filter. A client application may mount a drive on a computer based on metadata objects, such as providing a filter on object metadata to view files a user wants to access; or editing, reading, and updating object metadata as a file.

8 Claims, 11 Drawing Sheets

| OpenfileID: 11 | FileName : /folder/xrays/2017/P123.img | Object: objectstore:/xrays/2017/P123.img |
| --- | --- | --- |
| OpenfileID: 27 | FileName : /folder/xrays/2017/P139.img | Object: objectstore:/xrays/2017/P139.img |
| OpenfileID: 28 | FileName : /folder/xrays/2017/PA345.img | Object: objectstore:/A7F1298D0AA8897A |
| OpenfileID: 31 | FileName : /folder/wellington/scan2.img | Object: objectstore:/wellington/scan2.img |

MOUNTING DYNAMIC ENDPOINTS

CROSS-REFERENCE TO RELATED APPLICATIONS

This application claims priority of U.S. provisional patent application No. 62/368,048, filed Jul. 28, 2016, entitled "Mounting Dynamic Endpoints," which is hereby incorporated by reference. This application is related to U.S. patent application No. 62/368,050 filed Jul. 28, 2016 and also U.S. application Ser. No. 15/661,851 filed Jul. 27, 2017 entitled "Multi-Part Upload," each of which is hereby incorporated by reference.

FIELD OF THE INVENTION

Embodiments of the present invention relate generally to file systems, object storage and metadata. More specifically, embodiments of the present invention relate to the ability to access object metadata via a file system.

BACKGROUND OF THE INVENTION

Some existing systems provide access to data storage through a Representational State Transfer (REST) interface via a coupling that presents a file system interface for managing, storing, updating and retrieving objects, data and metadata. There are a variety of systems that provide such an interface, these include the Content File System (CFS) from Caringo, File Connectors from Scality and Coronado Access Points from Bridgestor.

The file system side of these couplings uses traditional file system protocols such as NFS (Network File System), Server Message Block (SMB)/Common Internet File System (CIFS) and File Transfer Protocol (FTP), through file system drivers, or through other mechanisms that provide a file system to a client computer.

These existing systems lack flexibility in that they do not include functionality to list a subset of objects on the basis of the object's metadata, nor do they include functionality to expose via a file system objects that are not created through it, i.e., objects that have been created directly through the object store or via other gateways to the object store. Users and applications only want to be presented with the subset of data (e.g., the digital objects) that they are interested in, and that subset should not always be the entire contents of a single bucket, container or exported directory, folder or share. Users and applications also want access to the desired set of objects through multiple means, e.g., file system and REST and other gateways. Existing file system interfaces also fail to provide access to object metadata that is stored with the object in the object store. Typically, file metadata is different from object metadata and it was not possible to access the object metadata via the traditional file system interface.

BRIEF DESCRIPTION OF THE DRAWINGS

The invention, together with further advantages thereof, may best be understood by reference to the following description taken in conjunction with the accompanying drawings in which:

FIG. 2 is an example of a list of open files to open file object mapping in accordance with an embodiment.

DETAILED DESCRIPTION OF THE INVENTION

Figure 1:
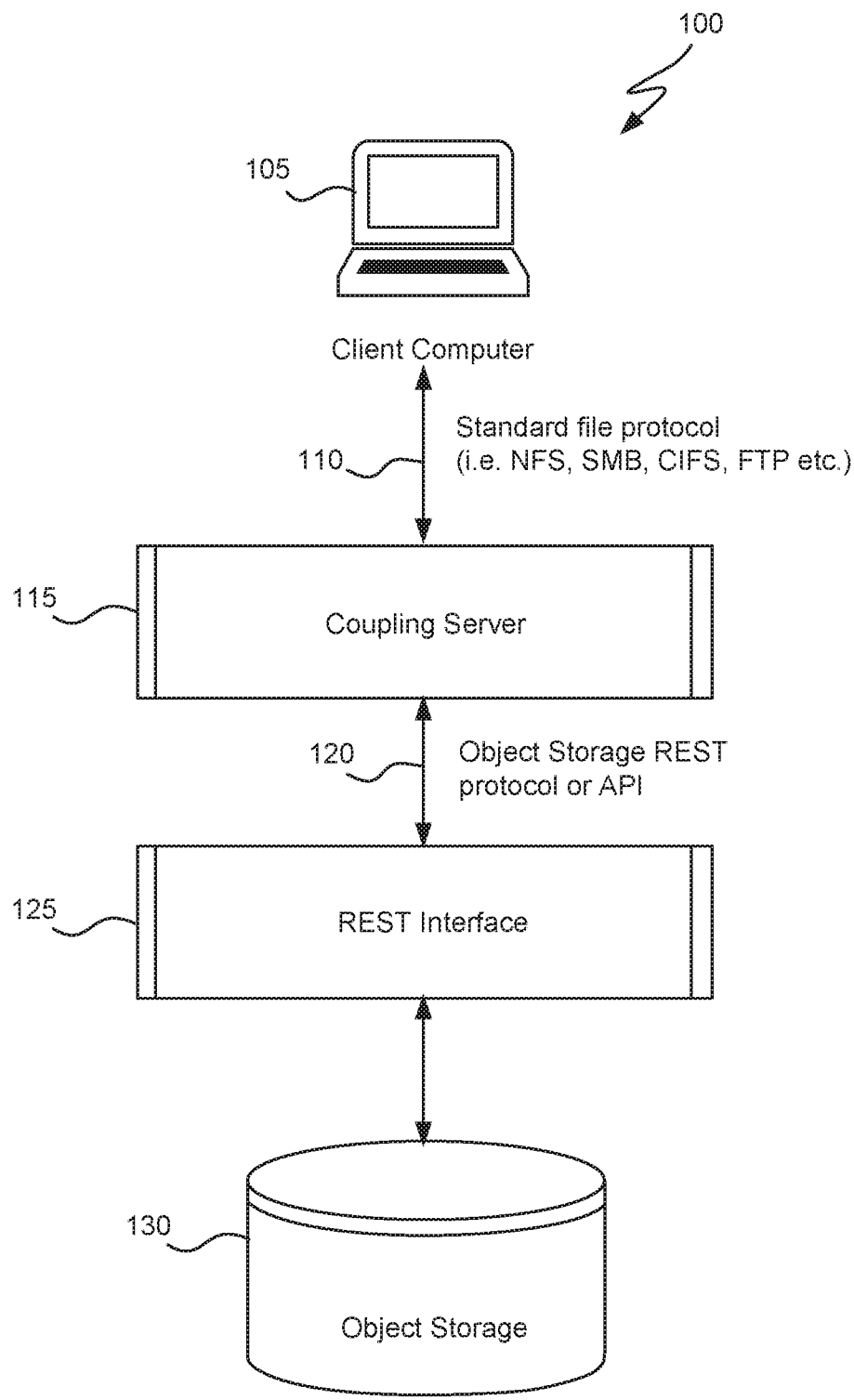
FIG. 1 is a block diagram of a system in accordance with an embodiment.

Many data storage systems use a REST interface, i.e., one that is compliant with HTTP (RFCs 2616, 7230, 7231, 7232, 7233, 7234, 7235, 7236 and 7237). These interfaces provide the ability to store, retrieve and manage both data objects and metadata in the form of HTTP headers and their values. Examples of such interfaces include Amazon's S3 services, Openstack Swift and Caringo SCSP. File system interfaces, on the other hand, typically map onto a set of files identified by name, by name prefix, or by some pre-specified region of storage, e.g., all objects and files belonging to a particular customer.

"Object storage" is used here in reference to stored data accessible through a REST interface, for both original data and metadata that may be defined when the data is stored, or later modified. The term is agnostic to the ultimate persisted format, i.e., object storage includes storage systems that ultimately persist data as files, as blocks, or as objects. It also is agnostic with regard to the computer server architecture, which may be clustered or not, and if clustered, may be symmetric or layered or organized as a ring, or some combination. An "object store" refers to one or a set of computer servers providing object storage.

Though the metadata of a digital object typically is captured as a set of HTTP headers, it may be captured via other aspects of a REST protocol that provide name-value pairs, such as query parameters. The values may be treated as text strings or interpreted as Booleans, numbers, dates, GPS locations, or other metrizable values.

As mentioned above, one difficulty with the prior art is that one cannot access the object metadata stored with the object in an object store via a traditional file system interface on a client machine. For example, a doctor in a clinic may have access to a file system that stores x-ray images from hundreds of patients, taken on different dates, and of different limbs. When patient X walks in, it is difficult and time-consuming for the doctor to find just those images of that particular patient that the doctor needs using the traditional file system hierarchy. Each x-ray image may be stored as a digital object in an object store, and may have metadata attached to it, but that metadata is not accessible to the doctor on his or her computer using a traditional file system interface.

Advantageously, and as will be described in greater detail below, one aspect of the present invention provides a user or client application the ability to access an object's metadata using a traditional file system interface without any changes to that interface, and or to the underlying file system technology or architecture. Thus, the user may read, modify or store an object's metadata via standard file system commands; any type of tag may be added to a file which will then be attached to the object in object storage as object metadata. For example, a patient's insurance identifier may be attached as a tag to each x-ray image of that patient allowing for easy later retrieval. In one simple example, the following file command returns the metadata corresponding to the insurance identifier for a particular file: Read filename:InsID. In another simple example, this file command saves a value for the metadata: Save filename:metadata. A tag attached to a file's metadata may be any conceivable type, value, range, etc.

Even more advantageously, the ability to access an object's metadata using a file system interface provides a second aspect of the present invention that allows a user or client application to mount a drive on a computer based on metadata of objects, thus providing a filter based on object metadata. A user or client application has ability to mount a drive that will provide a view of only the files they wish to see. For example, a doctor may mount a D: drive with a filter that specifies the particular insurance identifier of patient X; therefore, only those x-ray images having that particular metadata tag will appear in drive D: on the doctor's computer. In addition, as more files are created and stored in the object store having the particular tag specified by the filter, these files will now automatically appear in the view of drive D: on the computer.

Embodiments of the invention are processes that: 1) further refine the subset of objects mapped through the use of REST interface-accessible object and object metadata, 2) automatically attach metadata to all new objects created through the coupling, and 3) provide create, read and edit access to the REST interface-accessible metadata through traditional file system protocols.

FIG. 1 is a block diagram of a system 100 for implementing embodiments of the present invention. Shown is a client computer 105 on which executes a client application which may be any suitable software such as linux mount, linux command shells such as bash or commands like vi, Microsoft windows drive mapping, Microsoft windows explorer, Mac OS X finder, or applications such as NFS servers, SMB or CIFS servers such as Samba, FTP Servers, media streamers, document management systems and archiving applications which are arranged to communicate via a standard file protocol (e.g., NFS, SMB, CIFS, FTP, etc) 110 with the coupling server computer 115, to make various file requests, and to issue commands as will be described in greater detail below.

The presentation to the client application or user is simulated file system operations, having a traditional hierarchical namespace and providing to the application or user the standard operations to open or delete a file that already exists, to create a new file that does not yet exist, to list a subset of files, and to read data from or write data to an opened file. The embodiments of the present invention below describe implementations of file system operations initiated by the client application in the context of an object store 130.

The coupling server 115 is software that executes upon any computer and is capable of communicating with the client application of client computer 105 and with the object store 130, capable of storing logical predicates, and maintaining a list of open files by name or unique identifier with an associated object name or identifier of a digital object in the object store, and the object's metadata. An object store REST protocol or API 120 is used to communicate with a REST interface 125 to access the object storage 130.

An example of a list of open files is illustrated in FIG. 2, which shows a coupling server to open file object mapping in accordance with an embodiment. In this example, there is a mapping between an open fileID, a file name, and an object. For example, a doctor may mount a D: drive with a filter that specifies a mapping of open fileID, a file name, and an object. In this example, the first three entries are mappings for x-ray data and the fourth entry is for a scan.

Object Store 130 is any suitable object storage system with built in or third party extension object and object metadata indexing existing upon suitable computer hardware such as hard drives, solid-state disks, flash storage and may include object storage systems such as Caringo Swarm, Amazon S3, DDN, HDS, openstack Swift and IBM Cloud Object storage and Scality.

Figure 3:
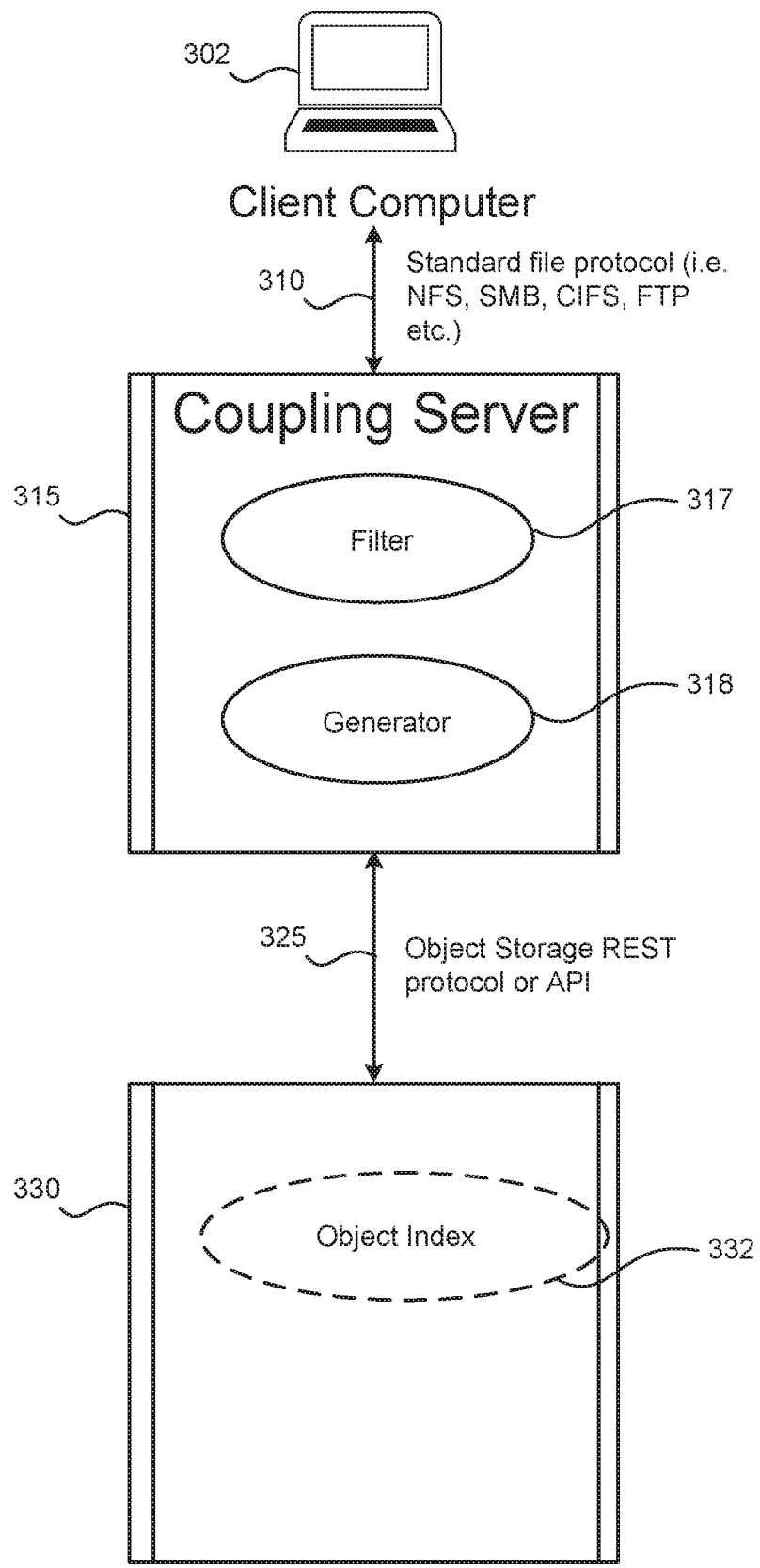
FIG. 3 is a block diagram of a system including a filter and generator in accordance with an embodiment.

FIG. 3 shows an implementation having a REST interface 325, a coupling server 315 that implements the processes that are embodiments of the present invention and a client on a client computer 305, whether a person using the coupling server 315 through a user interface on a client computer 305 and, or other computers using the coupling server via a network interface. The coupling server 315 may be a single computer or multiple computers working cooperatively. The coupling server 315 may include a filter 317 and a generator 319. An optional object index 332 may be included in the object store 330 or made available by a third party extension to support a search function.

In one embodiment an object's metadata may be exposed as a pseudo-file. In one embodiment the system supports the ability to mount or map a drive on a computer with a view of a subset of objects within the object store 330, the objects being scoped by a logical predicate (the filter 317) which operates on the object metadata. A logical function, the generator 319, ensures that new files created by the client application have metadata that matches the filter 317 attached, for example if the file view is being filtered on object with the attached metadata "X-meta-filemount: foo" then the generator will automatically attach that filters metadata of "X-meta-filemount: foo" to new files created by the client application, by doing so newly created files will match, appear and be accessible.

In the below example, all objects with the following headers may be filtered on and presented as a mount point:
X-meta-domain: www.mydomain.com
X-meta-filemount: foo In this example if any new files are created by the client application through this filtered mountpoint, then the generator 319 will automaticity attach the two headers and values above to the new files, by doing so the client application does not need to be aware of the active filter or details of the metadata to attach to new files itself.

The generator 319 may in some embodiments provide more complex text functions and other logical functions. The filter 317 in one embodiment is a general logical predicate. In addition, in the below descriptions, the filter 317 may simply be the constant predicate "True," in which case, all objects in the object store 330 are within its scope.

Returning to FIG. 3, in one embodiment the system captures from the client computer 305 a logical predicate on metadata, that is the filter 307 is intended to qualify the set of objects that are surfaced through a particular coupling of object data to the file system. This predicate may include the file system name as a variable in the predicate. The logical predicate filter may be predefined or included in the mount command from the client. For example, the client may request to mount "allimages" which has a predefined filter set matching objects with metadata tagged as images, or they may specify the filter as part of the mount request itself, such as request to mount where object metadata matches content-type=images The filter 317 then requests from the object index 332 a list of objects, including in the request the filter to restrict the object subset to, when such object search 3.e functionality is included in the object store 330 or third party extension, otherwise the filter 317 will itself refine the list to only those matching the requested filter from those returned by the object store 332, the list of matching objects obtained is then retuned by the coupling server 315 and from the coupling server 315 to the client computer 305 using the appropriate operation for the standard file protocol (NFS, SMB, Cifs, FTP etc) in use.

These components including the filter 317 and generator 319 are then used in the embodiments described below, thus creating a filtered object view file system mount point. In one embodiment, mounting is via standard file system methods such as the Unix/Linux mount command, Mac OS X finder connect to server, Microsoft Windows 'net use' or Windows Explorer 'add network location'. Advantageously, in one embodiment a file system mount point is defined against a set of objects qualified by having metadata that fits a particular predicate, the filter 317. The objects may have been created through the file system interface, as described below, or may be pre-existing in the object store 330.

Flow Diagrams

Figure 4:
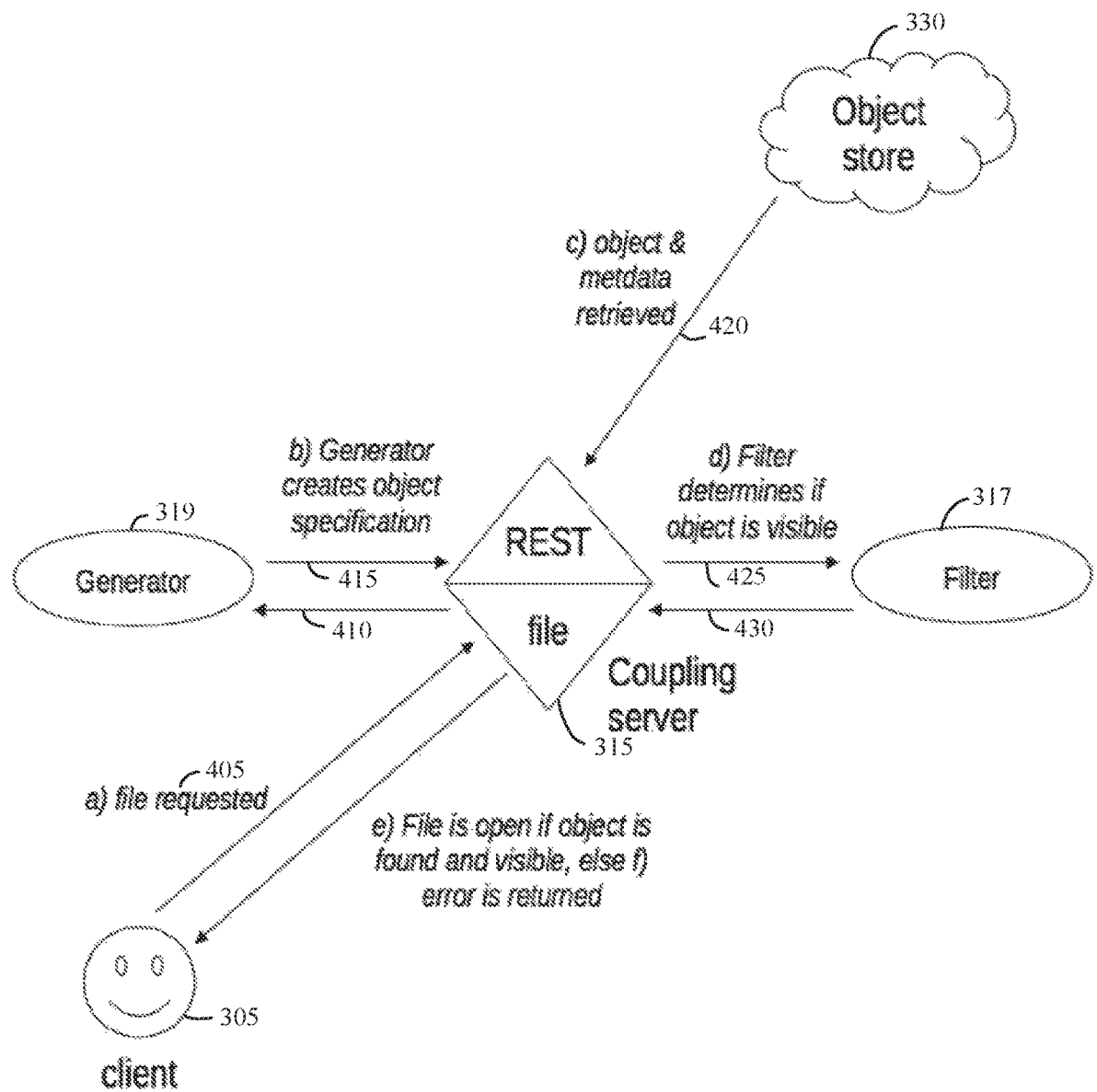
FIG. 4 is a diagram illustrating a flow of an Open command operation in which a client application opens a file of one of the objects in the object store in accordance with an embodiment.

FIG. 4 shows an embodiment of an Open command (Open) in which the client application opens as a file one of the objects in the object store. In one embodiment, the Open is preformed using standard file system applications, for example a file could be opened through Microsoft Word, Mac OS X preview, a pdf viewer, a specialized PAX application, a document management system, a file editor such as Unix/Linux vi or an application issuing a ISO C standard open or other language equivalent. FIG. 4 illustrates a set of steps: A client from client computer 305 specifies the file concerned as a request 405. The generator 319 receives a request 410 to convert the file name to an object name and generates an object specification 415. The object is located and its metadata is retrieved 420 from the object store. If the object is found, the filter 317 is applied 425 to the metadata to determine if the object is visible. If the filter 317 evaluates to "True," the object is presented 430 as having been opened through the file system interface and the coupling server stores the object-file pair as opened. If, however, the object is not located or the filter 317 evaluates to False, the file is presented as absent. In one embodiment the filter is reapplied on an open for security purposes to ensure that the user or application is allowed to open the file requested; if not a user could possibly request a file Open for a file that may exist in the object store but does not match the allowed filter. On a successful Open the coupling server returns a new file handle to the client; the client then uses this file handle to read or write data to the newly opened file.

The use of the generator 319 and filter 317 allows the scope of the "Open" command to be qualified by the metadata of the objects stored, a result that existing file system interfaces cannot achieve. Note that this command allows file system access to objects that have been created by means other than through the file system interface (which is described below in more detail).

Figure 5:
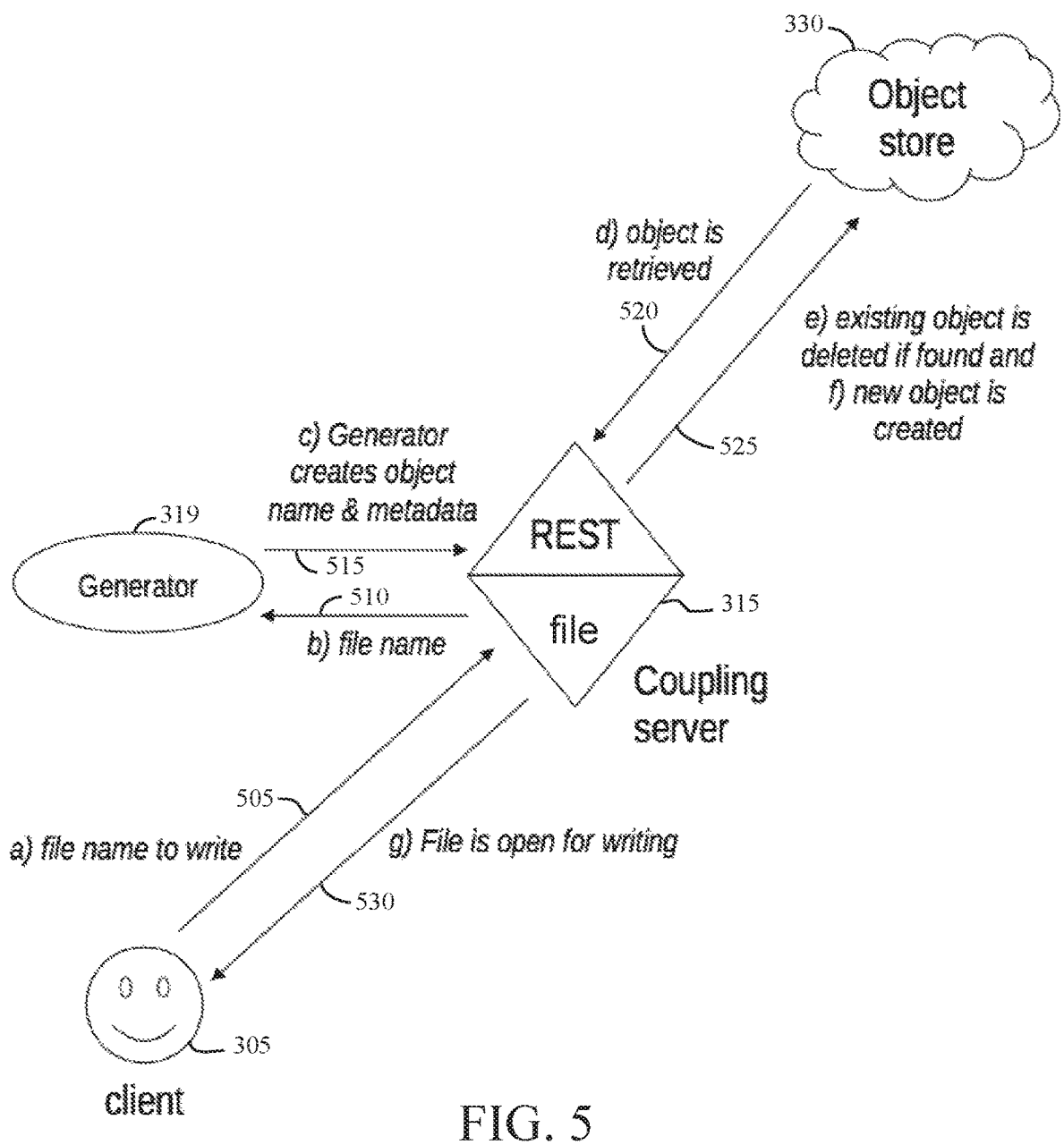
FIG. 5 illustrates a Create command operation in which the client application creates a new file in the Fin accordance with an embodiment.

FIG. 5 shows an embodiment of a Create command (Create) in which the client application creates a new file thus creating a new object in the object store as opposed to opening an existing file. In one embodiment the Create is performed using standard file system applications, for example a file could be created through Microsoft Word, Mac photos, a pdf editor, a specialized PAX application, a document management system etc, a file editor such as Unix/Linux vi or a application issuing a ISO C standard open( ) or other language equivalent. As illustrated in FIG. 5, in one embodiment the client specifies 505 the file concerned, which may include a file name to write. The file system interface provides 510 the file name and associated properties to the coupling server 315. The coupling server 315 applies the generator 319 to the file system name to generate an object name 515. If the object name exists it locates the object in the object store and retrieves it 520. If an existing object is found, it deletes 525 the object from the object store along with its metadata and creates a new object. The new object so described is created in the object store ready for writing. The coupling server stores the object-file pair as opened, and returns 530 a new file handle and success to the client. In one embodiment the use of Create and the generator 319 guarantees that the new object will be qualified by the filter 317 for subsequent use. On a successful Create the coupling server returns a new file handle to the client, the client then uses this file handle to read from or write data to the newly opened file.

Figure 6:
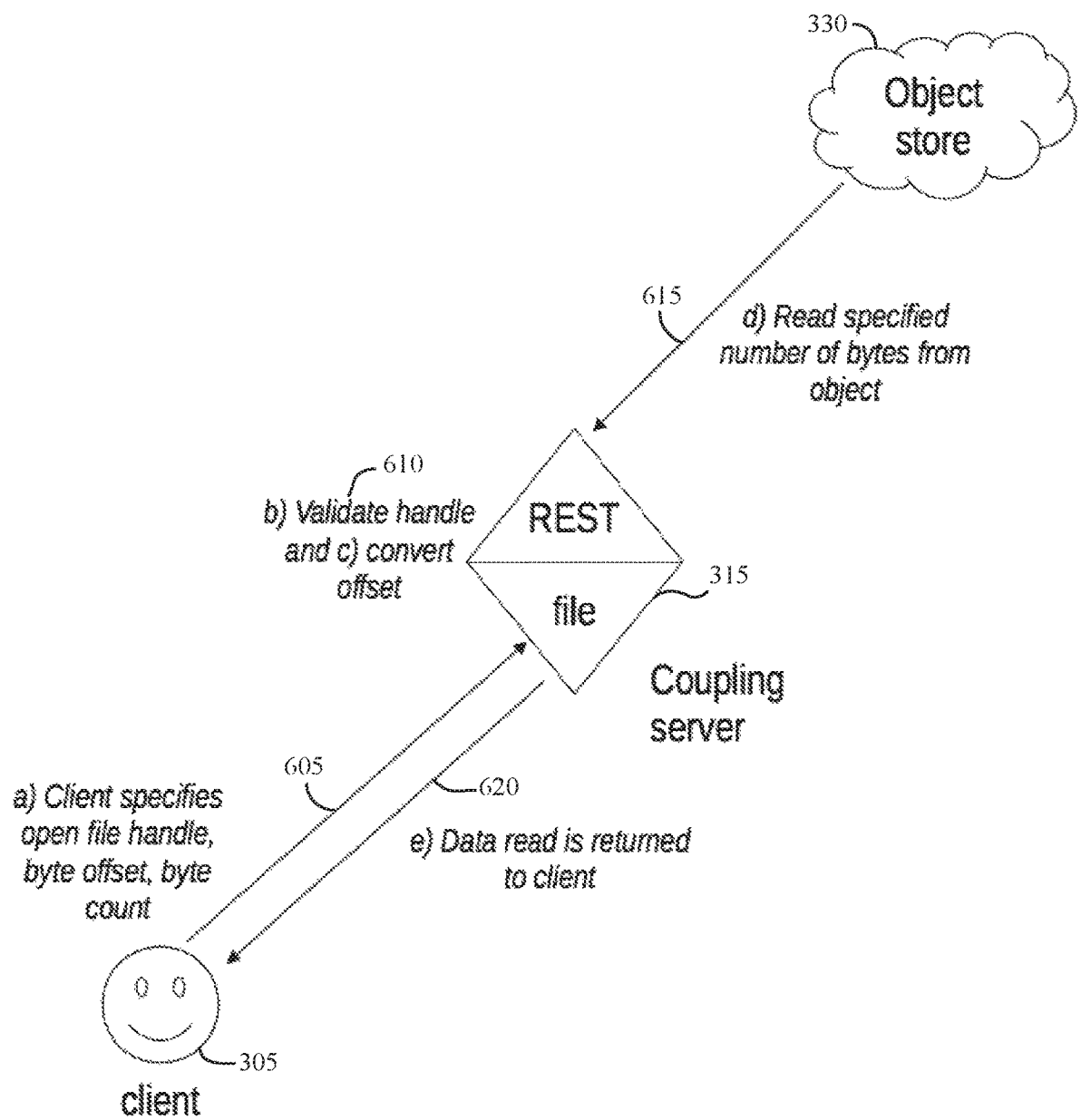
FIG. 6 illustrates a Read command operation in accordance with an embodiment.

FIG. 6 shows an embodiment of a Read command (Read) in which the client application of the client 305 reads a file that has been opened or created by one of the embodiments above. The object itself may also have been created previously using any support object store method. In one embodiment, the Read is preformed using standard file system applications, for example a file could be opened through Microsoft Word, Mac OS X preview, a pdf viewer, a specialized PAX application, a document management system, a file editor such as Unix/Linux vi or a application issuing a ISO C standard read or other language equivalent, the file system application will have obtained a file handle prior to issuing the Read using either the Open or Create method as described above. In one embodiment a Read follows the follows a sequence of steps that includes the client specifying the opened file handle (provided by Open or Create), and a number of bytes to read at a specific offset. The coupling server 315 validates the handle and converts the offset. This may include determining whether the specified file is open (e.g., does it have a matching file handle) for reading or writing, if not, returning an error, otherwise converting the file offset to an offset in the object, and reading 615 those specified number of bytes from the object in the object store, and returning them 620 to the client.

Figure 7:
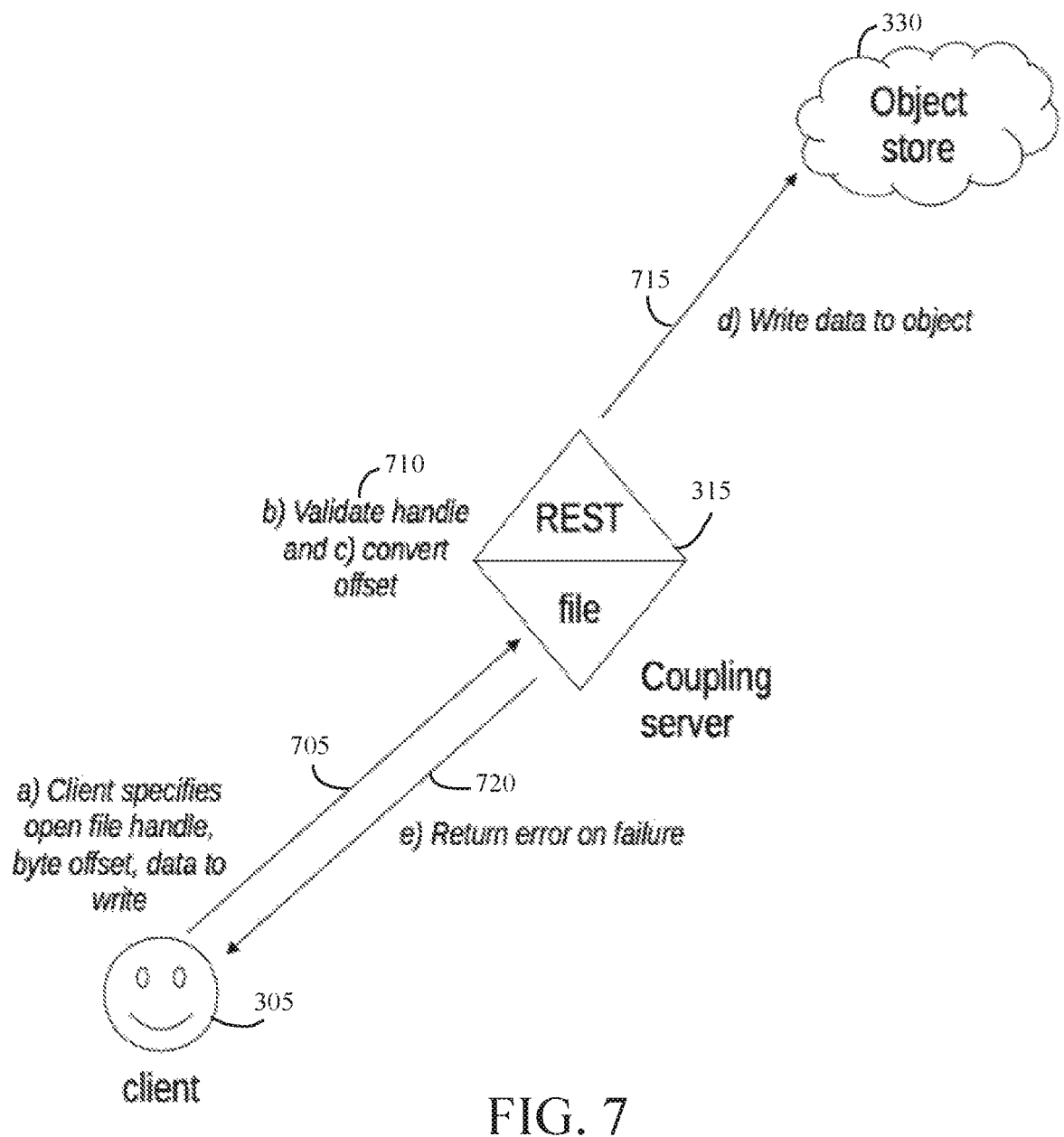
FIG. 7 illustrates a Write command operation in accordance with an embodiment.

FIG. 7 shows an embodiment of a write command (Write) in which the client application writes to a file that has been opened or created via the embodiments previous. In one embodiment, the Write is preformed using standard file system applications, for example a file could be opened or created and then written to through Microsoft Word, Mac OS X preview, a pdf editor, a specialized PAX application, a document management system, a file editor such as Unix/

Linux vi or a application issuing a ISO C standard fprintf( ), fputc etc or other language equivalent, the file system application will have obtained a file handle prior to issuing the Write using either the Open or Create method as described above. One embodiment includes the following steps. A client 305: the client specifies 705 the opened file handle, and a string of bytes to write at a specific offset. The coupling server 315 validate the handle and converts and offset 710, which can include determining that the specified file is open for writing, if not, returning an error and otherwise converting the file offset to an offset in the object. Writing data to an object 715 may be performing writing those bytes to the object in the object store. If the file handle is invalid or data cannot be written, an error is returned 720.

In the previous two embodiments, the object to be read from the object store (or to be written to the object store) may be a multi-part object that is uploaded or downloaded in pieces, as described in related patent application No. 62/368,050.

Figure 8:
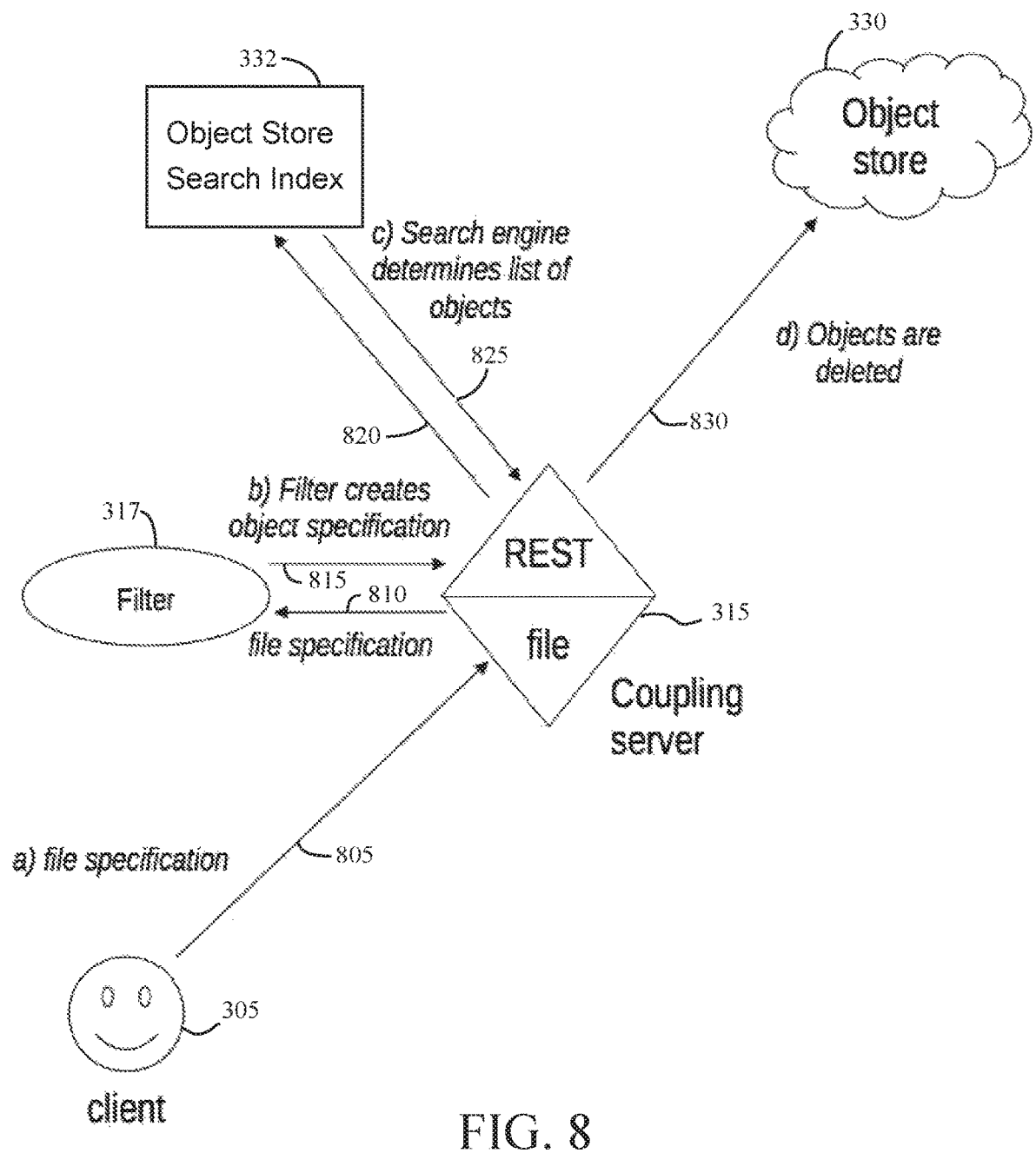
FIG. 8 illustrates an embodiment of a delete command in accordance with an embodiment.

FIG. 8 shows an embodiment (Delete) in which the client application deletes an object or set of objects from the object store. The Delete is preformed by the client by using standard file system applications such as Windows Explorer Delete, the Unix/Linux rm command or a application issuing a ISO C standard remove( ) or other language equivalent. In one embodiment, the client 305 specifies 805 a file or set of files by a regular expression on file names. The filter 317 may used to convert the file specification 810 into a specification of objects 815. The object specification is provided 820 to a search engine (based on the object store search index 332) to determine a set of objects 825 that qualify against the object stores search index 332. The qualified object objects are then deleted 830 from the object store, and their metadata removed from the Object Stores search index.

This approach allows the file system interface to delete not only objects that have been created by opening a new file with the file system interface (using the Create embodiment above), but also objects that have been created otherwise such as through the objects stores provided object API (i.e. Caringo SCSP, Amazon S3) or other third party application that has integrated into the object stores object API (i.e. third party applications such as cyberduck, s3browser, Caringo FileFly, Commvault). The use of the generator guarantees that the possible scope of the Delete command is restricted to a desired set of objects based on their object metadata.

Figure 9:
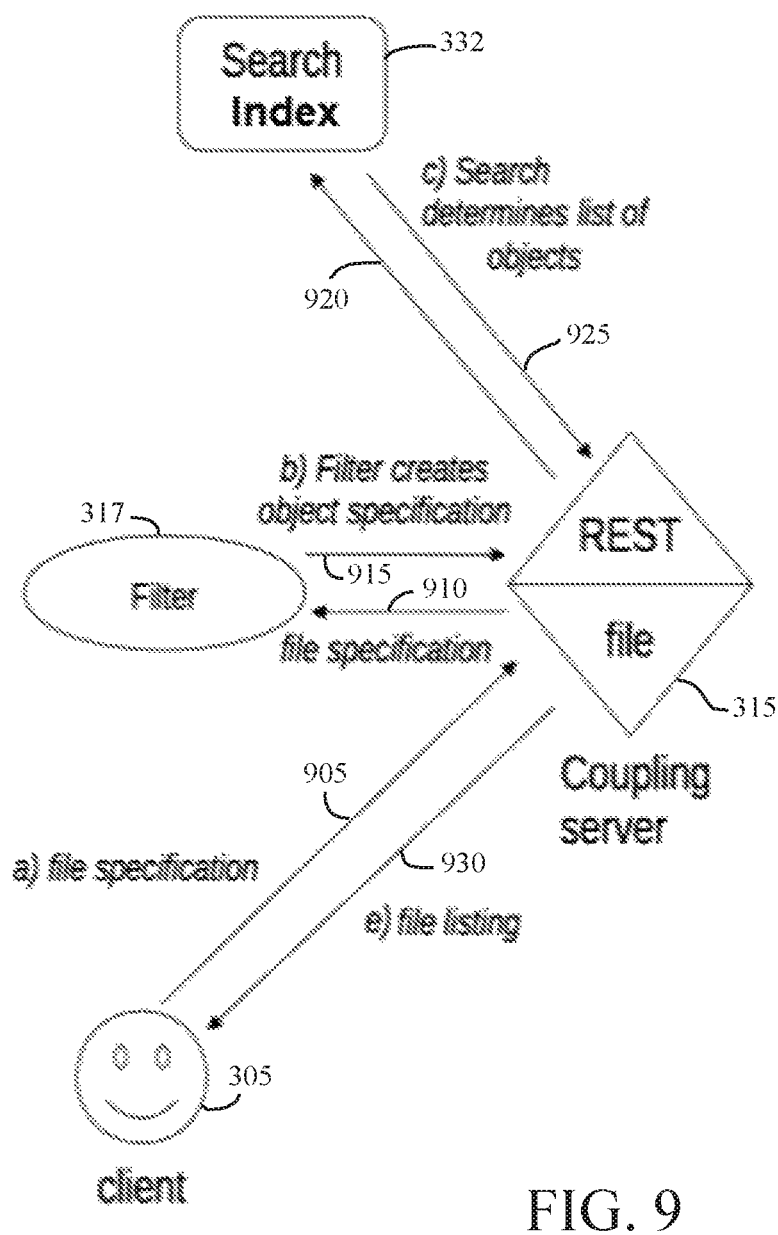
FIG. 9 illustrates an embodiment of a list command in accordance with an embodiment.

FIG. 9 shows an embodiment of a list command (List) in which the client application requests a listing of a subset of files. In one embodiment the List is performed by the client by using standard file system applications such as Windows Explorer, the Unix/Linux is command or a application issuing a ISO C standard readdir( ) or other language equivalent. One embodiment includes the client 305 requests a list of files based on a file specification 905 from the coupling server which match a customized client specified file specification that may include a regular expression or set of expressions, and possibly metadata criteria in addition to the stored filter. The coupling server 315 uses those qualifiers and the persisted client filter 317 to convert that into a predicate on object metadata. For example the file specification is provided 910 to the filter 317 which creates an object specification 915. The coupling server uses this to issue a query 920 to the object store search index using any method provided to the coupling server by the search index and/or object store to query the search index for object identifiers based on the metadata and perform a search that determines a list of objects 925. For each object with matching metadata returned from the search index the coupling server generates a file name and properties, and e) the coupling server returns 930 this list to the client.

In one embodiment the use of the generator guarantees that listings are scoped to the set of objects whose metadata qualifies them. Note that this embodiment exposes in the file system interface not only objects that have been created through the file system interface by the Create embodiment, but also those objects which have been created directly in the object store such as through the objects stores provided object API (i.e. Caringo SCSP, Amazon S3) or other third party application that has integrated into the object stores object API (i.e. third party applications such as cyberduck, s3browser, Caringo FileFly, Commvault.

Figure 10:
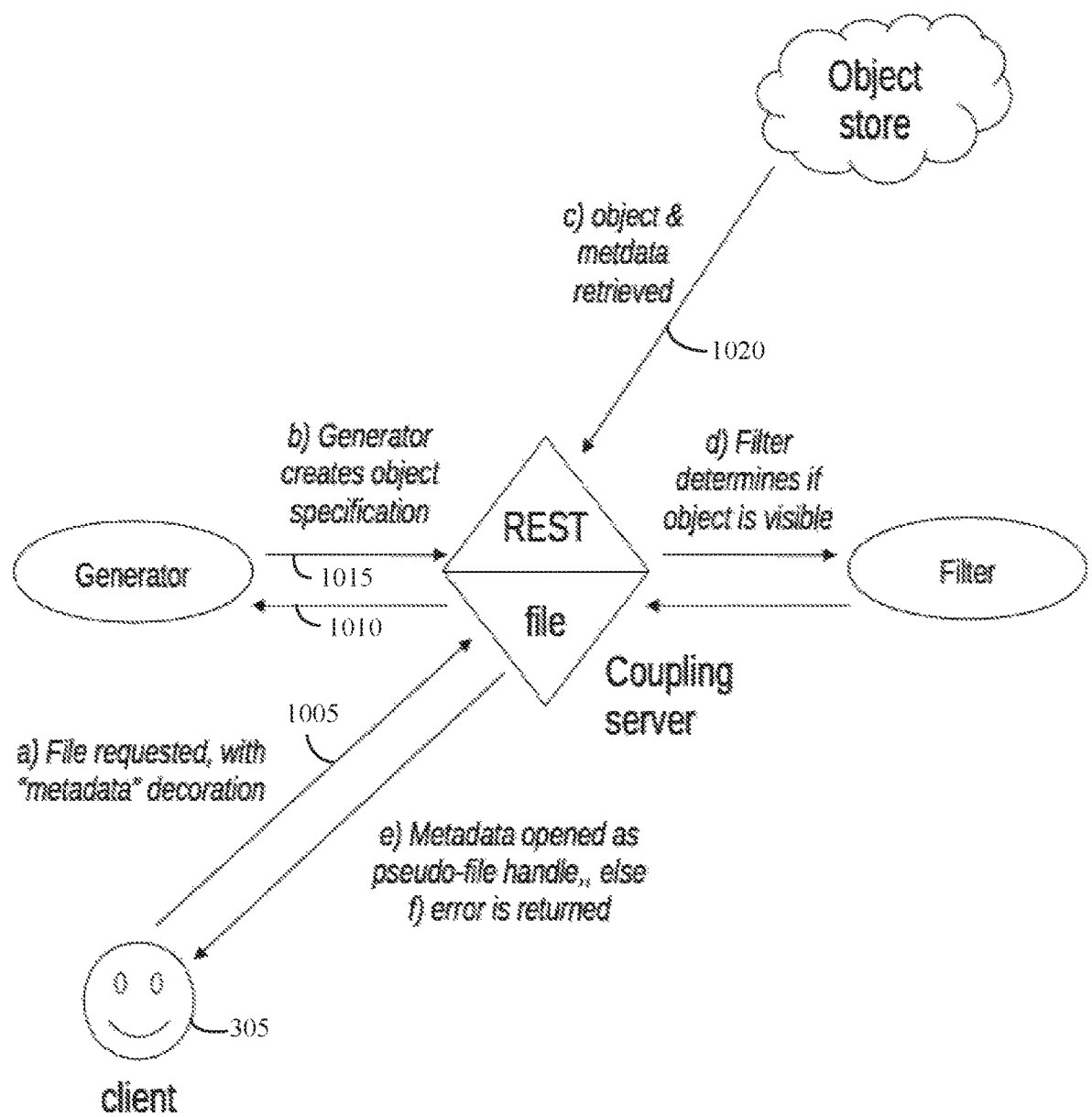
FIG. 10 illustrates metadata exposure in which the object store provides the metadata for an object as a pseudo-file in accordance with an embodiment.

FIG. 10 shows an eighth embodiment (metadata exposure) in which the object store provides the metadata for an object as a pseudo-file. In contrast, objects metadata is conventionally not available to clients using standard file system methods, modifying traditional file system commands, methods and APIs would require all existing and new file based applications to be updated to reflect, this is not feasible. Instead this embodiment provides a method for standard file clients and applications to access and update an objects metadata without the requirement to change or add to standard file system APIs and methods, this in addition provides existing file system clients and applications access to an Objects metadata without requiring major changes to those clients and applications, in many cases no application code changes are now needed at all, only minor re-education of the application and clients users.

The name for the object is derived from the file name by a fixed file name mapping, such as a predefined prefix or a predefined suffix for the file name or other label of the file name. For example if the Object name is "exampleobject" then when the predefined suffix of ":metadata" is added, resulting in "exampleobject:metadata" the label is ":metadata" The metadata may then be retrieved and edited as a file.

In one embodiment, the client specifies in a file request 1005 the file concerned, using the metadata label.) The generator is provided this information 1010 and is used to convert the file name to an object specification 1015 (object name), which may include (removing the label). The object is then located and the object and its metadata is retrieved 1020 from the object store 330. If the object is found, the filter is applied to the metadata, and e) if the filter evaluates to True, the file's metadata is presented as a file opened through the file system interface and the coupling server stores the object-file pair as opened. If, however, the object is not located or the filter evaluates to False, then the file is presented as absent.

As an example, consider a file "somefile", and assume that ":metadata" is used as the metadata label. The client application provides the command open "somefile:metadata" This command opens a pseudo-file that presents as its contents the metadata associated with the object representing "somefile", the client can then read, modify and add new metadata to the object as thought it was written standard data to the file. For example:

If a object called "exampleobject" contains:
the data "This is the file data"
and the metadata "x-meta-data: this is the meta data"
And the metadata label in use is :metadata
Opening and then reading the file in Unix/Linux using the command "cat exampleobject" will display the data "This is the file data"

Whereas Opening and then reading the file in Unix/Linux using the command "cat exampleobject:metadata" will display the attached metadata "x-meta-data: this is the meta data"

In addition, an Unix/Linux example of Opening and then writing to the file as "echo 'new data'>exampleobject" will change the object data to be 'new data', whereas Opening and then writing in Unux/Linux like "echo 'x-meta-data: new metadata'>exampleobject:metadata" will change the metadata attached to the Object named "exampleobject"

Computer System Embodiment

Figure 11A:
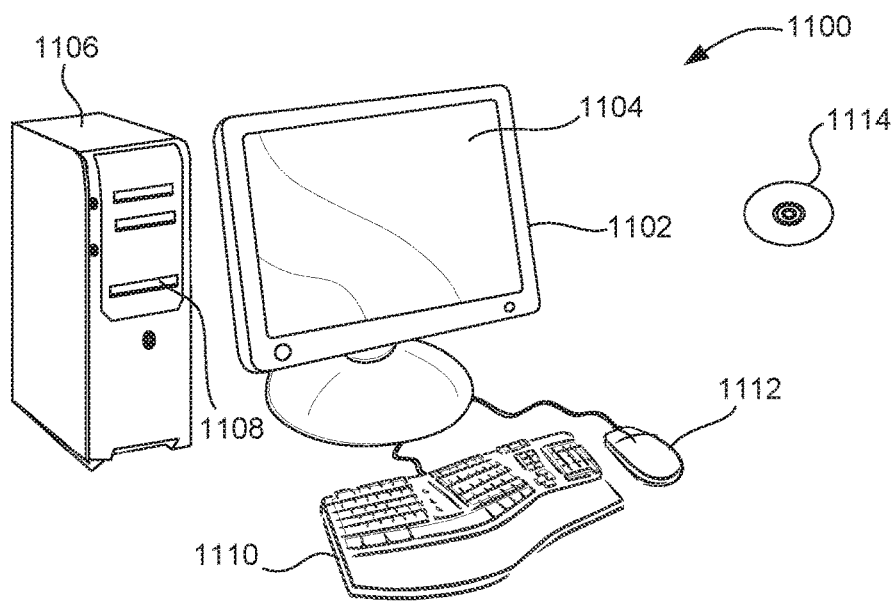
FIGS. 11A and 11B illustrate a computer system suitable for implementing embodiments of the present invention.
Figure 11B:
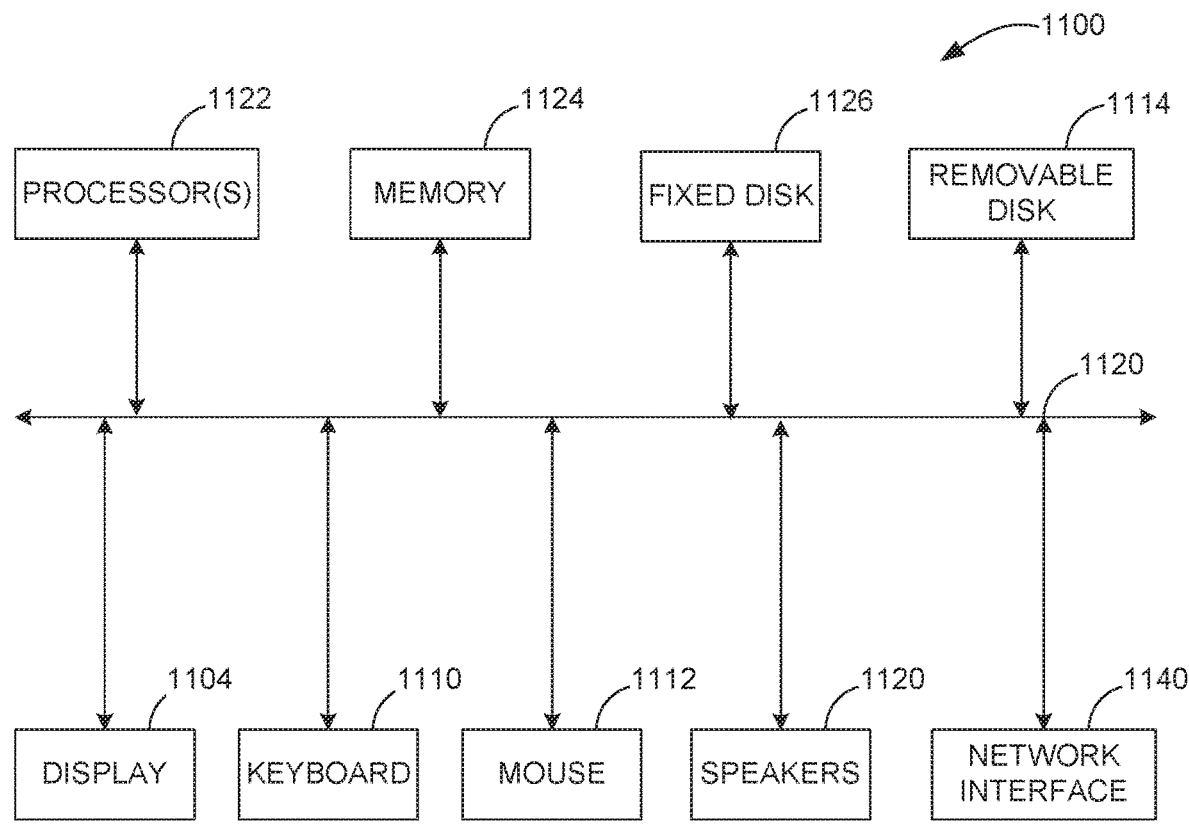

FIGS. 11A and 11B illustrate a computer system 1100 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 1100 includes a monitor 1102, a display 1104, a housing 1106, a disk drive 1108, a keyboard 1110 and a mouse 1112. Disk 1114 is a computer-readable medium used to transfer data to and from computer system 1100.

FIG. 11B is an example of a block diagram for computer system 1100. Attached to system bus 1120 are a wide variety of subsystems. Processor(s) 1122 (also referred to as central processing units, or CPUs) are coupled to storage devices including memory 1124. Memory 1124 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 1126 is also coupled bi-directionally to CPU 1122; it provides additional data storage capacity and may also include any of the computer-readable media described below. Fixed disk 1126 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 1126, may, in appropriate cases, be incorporated in standard fashion as virtual memory in memory 1124. Removable disk 1114 may take the form of any of the computer-readable media described below.

CPU 1122 is also coupled to a variety of input/output devices such as display 1104, keyboard 1110, mouse 1112 and speakers 1130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1122 optionally may be coupled to another computer or telecommunications network using network interface 1140. With such a network interface, it is contemplated that the CPU might receive information from the network, or might output information to the network in the course of performing the above-described method steps. Furthermore, method embodiments of the present invention may execute solely upon CPU 1122 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of accessing from a client application on a client computer a subset of objects from cloud object storage, said method comprising:
   a. receiving, at the client computer, a tag input by a human end user;
   b. mounting a drive on the client computer via a mount command from the client application which includes a filter specifying the tag;
   c. receiving, at a coupling server on a computer via a file protocol, a file access CREATE request from a file system interface of the client application that specifies a file name to write, wherein the tag is stored on the coupling server;
   d. generating for a created file, by the coupling server, a new object and new object metadata that matches the tag, said new object and new object metadata being stored in the cloud object storage;
   e. returning, by the coupling server, to the client application the file name for the created file allowing the client application to read from or write to the new object in cloud object storage; and
   f. providing to the client application a view of the subset of objects within the cloud object storage, wherein the subset of objects in the cloud object storage have associated object metadata matching the tag of the filter that is included in the mount command from the client application; wherein the client application can access the subset of objects within the cloud object storage.

2. A method as recited in claim 1 wherein objects in the cloud object storage are accessed via a REST interface.

3. A method as recited in claim 1, wherein objects in the cloud object storage are accessed via an API.

4. A method as recited in claim 1 wherein the tag is not communicated to the cloud object storage.

5. A method of accessing from a client application on a client computer a subset of objects from cloud object storage, said method comprising:
   receiving, at the client computer, a tag input by a human end user;

mounting a drive on the client computer via a mount command from the client application which includes a filter specifying the tag;

receiving, at a coupling server on a computer via a file protocol, a file access LIST request from a file system interface of the client application that specifies a file specification including list metadata, wherein the tag is stored on the coupling server;

generating, by the coupling server, an object specification from the file specification that includes the tag and the list metadata;

querying, by the coupling server, a search index of the cloud object storage for a list of objects whose metadata matches the object specification;

generating, by the coupling server, a list of file names corresponding to said list of objects;

returning, by the coupling server, to the client application the list of file names; and providing to the client application a view of the subset of objects within the cloud object storage, wherein the subset of objects in the cloud object storage have associated object metadata matching the tag of the filter that is included in the mount command from the client application; wherein the client application can access the subset of objects within the cloud object storage.

6. A method as recited in claim 5 wherein the tag is not communicated to the cloud object storage.

7. A method of accessing from a client application on a client computer a subset of objects from cloud object storage, said method comprising:

receiving, at the client computer, a tag input by a human end user;

mounting a drive on the client computer via a mount command from the client application which includes a filter specifying the tag;

receiving, at a coupling server on a computer via a file protocol, a file access METADATA EXPOSURE request from a file system interface of the client application that specifies a file name having a predefined label for a requested file, wherein the tag is stored on the coupling server;

creating, by the coupling server, an object specification from the file name of the requested file;

retrieving, by the coupling server, an object and its metadata corresponding to the object specification;

determining, by the coupling server, that the metadata of the object matches the tag;

returning, by the coupling server, to the client application a file handle for a pseudo file that includes the metadata; and providing to the client application a view of the subset of objects within the cloud object storage, wherein the subset of objects in the cloud object storage have associated object metadata matching the tag of the filter that is included in the mount command from the client application; wherein the client application can access the subset of objects within the cloud object storage.

8. A method as recited in claim 7 wherein the tag is not communicated to the cloud object storage.

* * * * *